(12) United States Patent
Sun et al.

(10) Patent No.: US 11,124,987 B2
(45) Date of Patent: Sep. 21, 2021

(54) TENT WITH CONVENIENT LOCKING MECHANISM FOR TELESCOPIC LEG TUBE

(71) Applicant: ZHEJIANG JIANSHENG LEISURE PRODUCTS CO.,LTD, Zhejiang (CN)

(72) Inventors: Yuanru Sun, Zhejiang (CN); Jian He, Zhejiang (CN)

(73) Assignee: ZHEJIANG JIANSHENG LEISURE PRODUCTS CO., LTD, Zhejiang (CN)

( * ) Notice: Subject to any disclaimer, the term of this patent is extended or adjusted under 35 U.S.C. 154(b) by 0 days.

(21) Appl. No.: 16/642,016

(22) PCT Filed: Apr. 29, 2019

(86) PCT No.: PCT/CN2019/084961
§ 371 (c)(1),
(2) Date: Feb. 25, 2020

(87) PCT Pub. No.: WO2020/107805
PCT Pub. Date: Jun. 4, 2020

(65) Prior Publication Data
US 2020/0240169 A1    Jul. 30, 2020

(30) Foreign Application Priority Data
Nov. 30, 2018  (CN) .......................... 201811457263.X

(51) Int. Cl.
*E04H 15/60*   (2006.01)
*F16B 7/14*    (2006.01)
(Continued)

(52) U.S. Cl.
CPC ............. *E04H 15/50* (2013.01); *E04H 15/46* (2013.01); *A47F 5/13* (2013.01); *E04H 15/18* (2013.01);
(Continued)

(58) Field of Classification Search
CPC .......... E04H 15/50; E04H 15/46; E04H 15/06
See application file for complete search history.

(56) References Cited

U.S. PATENT DOCUMENTS 4,185,936 A * 1/1980 Takahashi ............. F16B 7/1454
16/DIG. 39
4,596,484 A * 6/1986 Nakatani ............... F16B 7/1454
248/188.5
(Continued)

FOREIGN PATENT DOCUMENTS

CN     200993141    12/2007
CN     103221698    7/2013
(Continued)

OTHER PUBLICATIONS

International Search Report (Form PCT/ISA/210) of PCT/CN2019/084961, dated Sep. 2, 2019, pp. 1-5.

*Primary Examiner* — Noah Chandler Hawk
(74) *Attorney, Agent, or Firm* — JCIP Global Inc.

(57) ABSTRACT

A tent with convenient locking mechanism for telescopic leg tube includes a tent rack and support legs attached to an underside of the tent rack. The support legs include a fixed leg tube, a movable leg tube movable up and down within the fixed leg tube, and a locking mechanism defining movement of the movable leg tube. The locking mechanism includes a locking plate movably disposed on the fixed leg tube and movable forward and backward relative to the movable leg tube, and a locking member capable of locking the movable leg tube by linkage with the locking plate. Through the coaxial connection between the locking plate and the locking member, the structure is simple, the connection reliability is high, and the operation is convenient, so that the locking and unlocking may be realized only by rotating the locking plate.

9 Claims, 6 Drawing Sheets

(51) Int. Cl.
    *E04H 15/50*     (2006.01)
    *E04H 15/46*     (2006.01)
    *A47F 5/13*     (2006.01)
    *E04H 15/18*     (2006.01)
    *E04H 15/64*     (2006.01)

(52) U.S. Cl.
    CPC .............. *E04H 15/60* (2013.01); *E04H 15/64* (2013.01); *F16B 7/14* (2013.01)

(56) References Cited

U.S. PATENT DOCUMENTS

| | | | | |
|---|---|---|---|---|
| 4,761,092 A * | 8/1988 | Nakatani | ............... | F16B 7/1454 248/188.5 |
| 7,293,934 B1 * | 11/2007 | Huang | ................... | F16B 7/105 403/109.1 |
| 8,746,267 B2 * | 6/2014 | Lovley, II | ............... | E04H 15/44 135/120.2 |
| 9,482,254 B2 * | 11/2016 | Lai | ........................ | F16B 7/1418 |

FOREIGN PATENT DOCUMENTS

| | | | | |
|---|---|---|---|---|
| CN | 203468132 | 3/2014 | | |
| CN | 203547219 | 4/2014 | | |
| CN | 204024196 | 12/2014 | | |
| CN | 104675186 | 6/2015 | | |
| CN | 204511007 | 7/2015 | | |
| CN | 109356442 | 2/2019 | | |
| EP | 1186733 A1 * | 3/2002 | ............. | E04H 15/50 |
| GB | 2171444 | 8/1986 | | |

\* cited by examiner

TENT WITH CONVENIENT LOCKING MECHANISM FOR TELESCOPIC LEG TUBE

CROSS-REFERENCE TO RELATED APPLICATION

This application is a 371 of international application of PCT application serial no. PCT/CN2019/084961, filed on Apr. 29, 2019, which claims the priority benefit of China application no. 201811457263.X, filed on Nov. 30, 2018. The entirety of each of the above mentioned patent applications is hereby incorporated by reference herein and made a part of this specification.

BACKGROUND

Technical Field

The present invention belongs to the technical field of folding tents, in particular, to a tent with a convenient locking mechanism for a telescopic leg tube.

Description of Related Art

Folding tents are widely used in people's daily life, such as large-scale exhibitions, mobile stalls, outdoor sports, travel and leisure, adventure activities, temporary places, temporary garages, etc., having the characteristics of being able to shade, shelter from rain, and shelter from the wind. It is light and durable, easy to carry, and free to retract.

Folding tents mostly use retractable support legs including an outer tube, an inner tube and a locking mechanism for locking the relative positions of the outer tube and the inner tube, and the inner tube is telescoped by the locking mechanism, thereby realizing the extension and retraction of the support leg. It can be seen that the locking mechanism is the key to realize the extension and retraction of the support legs. There are many locking mechanisms in the prior art, such as a folding tent disclosed in Chinese patent of CN104675186A. The folding tent includes a folding tent rack, a tarpaulin covering the tent rack, and a locking device for locking the tent rack in an open state. The tent rack includes a roof rack and at least three support legs connected under the roof rack. Each support leg includes an outer tube assembly, an inner tube telescopically inserted into the outer tube assembly along the self-length direction, and a locking mechanism used for limiting the relative position between the outer tube assembly and the inner tube. The locking mechanism includes a pressing piece movably arranged on the outer tube assembly and moving relative to the inner tube, and a spring used for enabling the pressing piece to be abutted on the outer tube assembly and be tightly abutted with the outer wall of the inner tube when force is applied to the pressing piece. When the locking mechanism is in the locked state, the pressing piece is pressed against the outer wall of the inner tube under the force of the spring, so that the inner tube cannot move, and the pressing piece is pressed against the outer tube assembly, so that the pressing piece is not free to move. When the operator overcomes the force of the spring to pull the pressing piece to unlock the locking mechanism, the pressing piece and the outer wall of the inner tube are released from each other, so that the inner tube can be telescopically moved. That is, the present invention realizes the locking of the outer tube and the inner tube by the cooperation of the pressing piece and the spring. However, the locking mechanism has to be locked and unlocked by the action of the spring, and the use of the spring makes the locking mechanism difficult to install. In addition, the pressing piece is locked by the elastic deformation of the spring, so that the reliability is poor.

SUMMARY

In view of the problems existing in the prior art, the object of the present invention is to design a technical solution in which a tent with a convenient locking mechanism for a telescopic leg tube is provided.

The tent with convenient locking mechanism for telescopic leg tube comprises a tent rack and support legs attached to an underside of the tent rack, the support legs including a fixed leg tube, a movable leg tube movable up and down within the fixed leg tube, and a locking mechanism defining movement of the movable leg tube. The locking mechanism includes a locking plate movably disposed on the fixed leg tube and movable forward and backward relative to the movable leg tube, and a locking member capable of locking the movable leg tube by linking with the locking plate.

The tent with convenient locking mechanism for telescopic leg tube, characterized in that a mounting seat is fixedly disposed at a lower port of the fixed leg tube, the mounting seat is provided with a stroke hole, and the stroke hole is connected to the locking plate through a shaft. The locking plate moves in the stroke hole by rotation of the shaft, thereby realizing the forward and backward movement of the locking plate relative to the movable leg tube.

The tent with convenient locking mechanism for telescopic leg tube, characterized in that the locking member includes a locking end capable of being tightly cooperated with the movable leg tube and a connecting end connected to the locking plate, and the locking end is brought into abutting against and separated from the movable leg tube under the linkage of the locking plate to achieve locking and unlocking.

The tent with convenient locking mechanism for telescopic leg tube, characterized in that a side of the locking plate adjacent to the movable leg tube is further provided with a limit block extending toward the movable leg tube, and the limit block abuts against the movable leg tube in a locked state.

The tent with convenient locking mechanism for telescopic leg tube, characterized in that the locking member is disposed coaxially with the locking plate through the shaft.

The tent with convenient locking mechanism for telescopic leg tube, characterized in that the mounting seat includes an upper mounting seat and a lower mounting seat that are fastened up and down.

The tent with convenient locking mechanism for telescopic leg tube, characterized in that a side of the locking plate adjacent to the movable leg tube is provided with an abutment foot extending toward the movable leg tube, and the shaft is disposed in the abutment leg. In a locked state, the abutment foot abuts against the mounting seat or the fixed leg tube to displace the shaft to an end of the stroke hole away from the movable leg tube. In an unlocked state, the abutment foot is separated from the mounting seat or the fixed leg tube to displace the shaft to an end of the stroke hole adjacent to the movable leg tube.

The tent with convenient locking mechanism for telescopic leg tube, characterized in that the locking member is a U-shaped member. An open end of the locking member is the connecting end, and one end of the locking member away from the open end is a locking end, the movable leg tube passing through the locking member. In a locked state, the locking end abuts against the movable leg tube. In an unlocked state, the locking end is separated from the movable leg tube.

The tent with convenient locking mechanism for telescopic leg tube, characterized in that the abutment foot is provided with an arcuate guide surface. Compared with the prior art, the present invention has the following beneficial effects.

1) Through the coaxial connection between the locking plate and the locking member, the structure is simple, the connection reliability is high, and the operation is convenient, so that the locking and unlocking may be realized only by rotating the locking plate.

2) Through the arrangement of the stroke hole in the mounting seat, the movement of the shaft is facilitated, and the position of the locking member is conveniently controlled.

3) The locking member adopts a U-shaped structure, which improves the degree of cooperation with the movable leg tube and improves the stability during locking.

DESCRIPTION OF THE EMBODIMENTS

The present invention is further illustrated by the following description in conjunction with the accompanying drawings.

Embodiment 1

Figure 1:
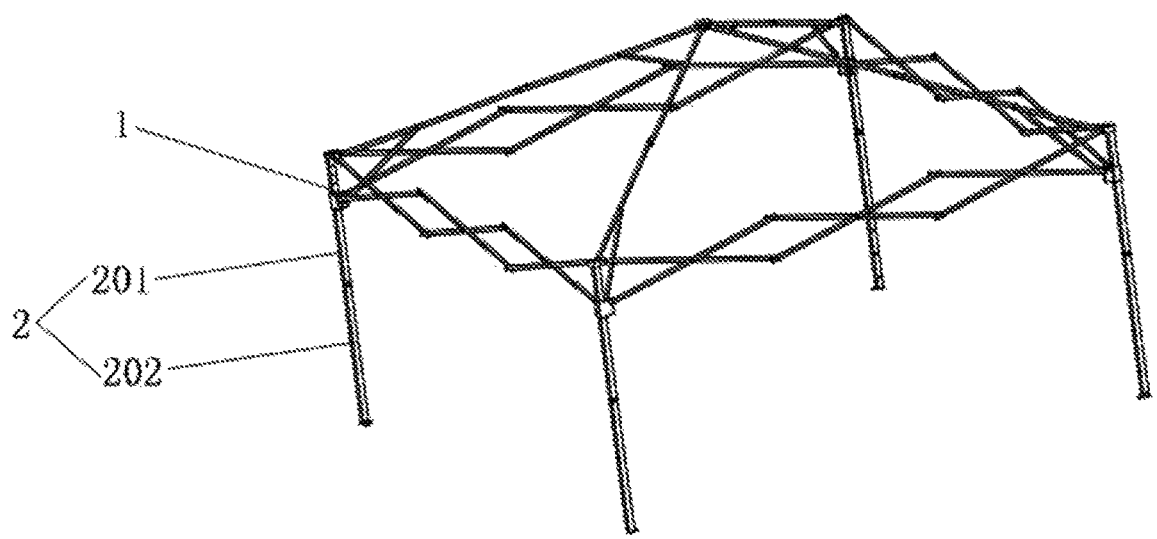
FIG. 1 is a view showing a structure of a folding tent in the present invention.
Figure 2:
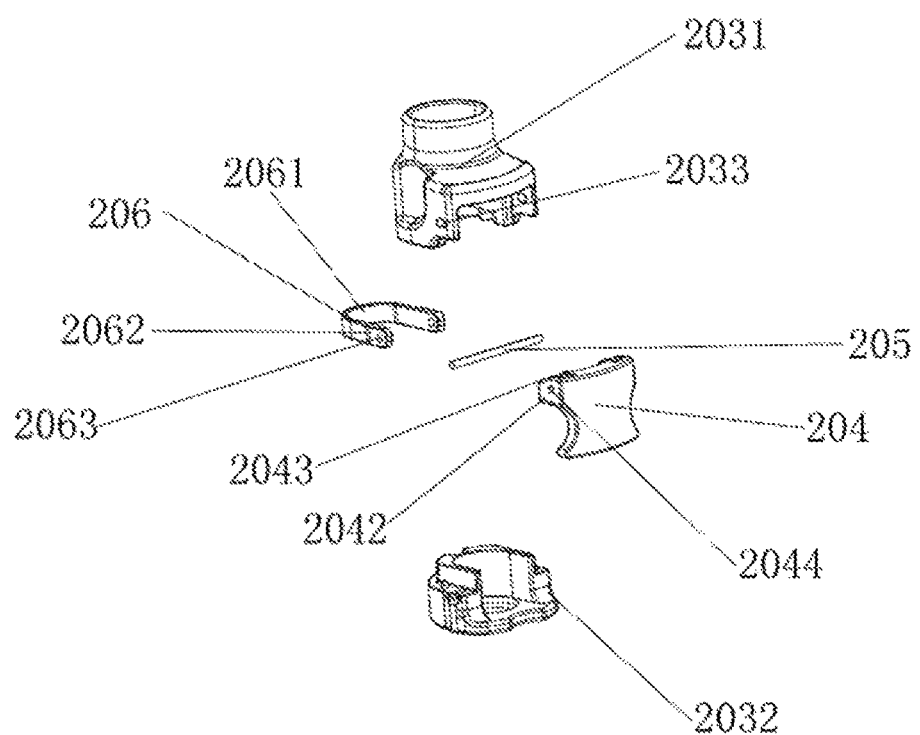
FIG. 2 is an exploded view of a locking mechanism in Embodiment 1 of the present invention.
Figure 3:
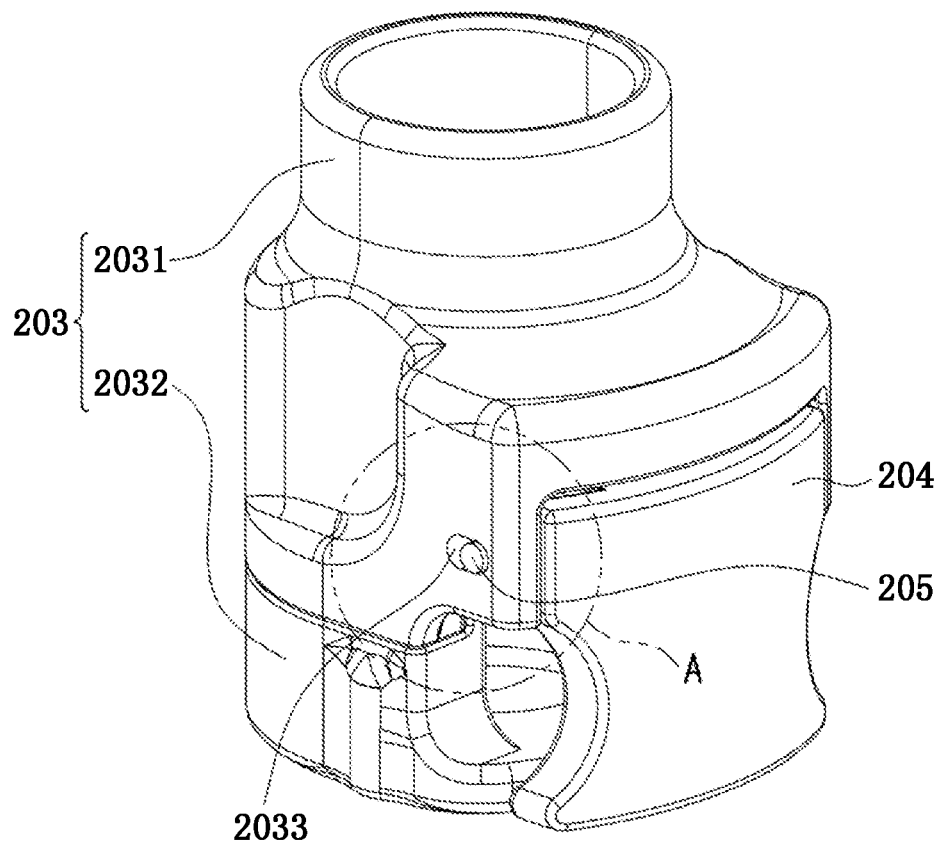
FIG. 3 is a view showing a structure of the locking mechanism in Embodiment 1 of the present invention.
Figure 3A:
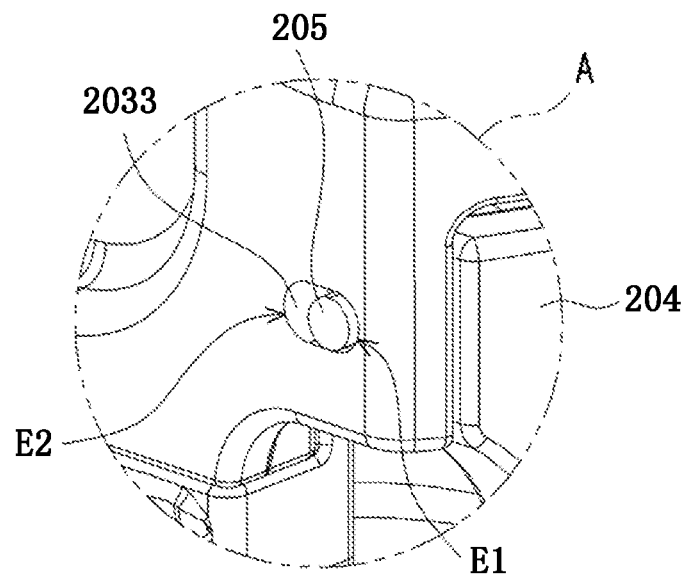
FIG. 3A is an enlarged view showing area A in FIG. 3.
Figure 4:
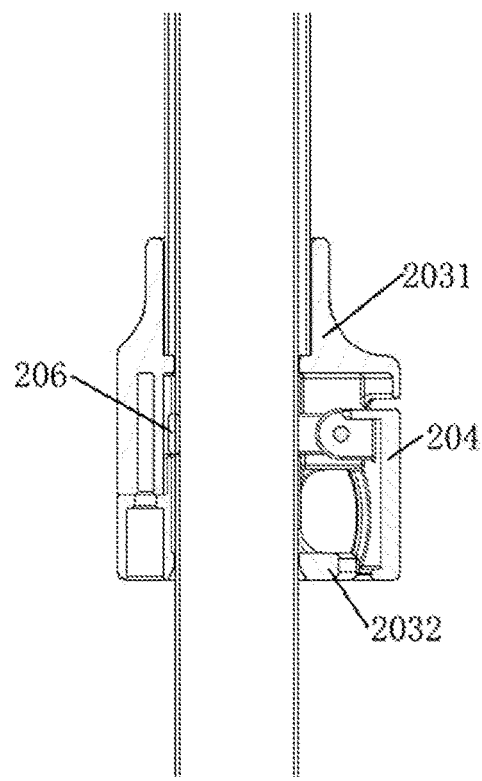
FIG. 4 is a cross-sectional structural view showing a locked state in Embodiment 1 of the present invention.
Figure 4A:
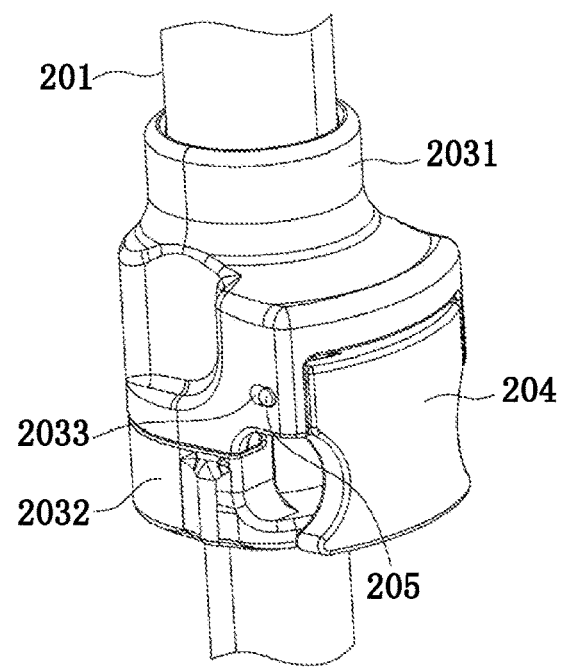
FIG. 4A is an external view corresponding to FIG. 4.
Figure 5:
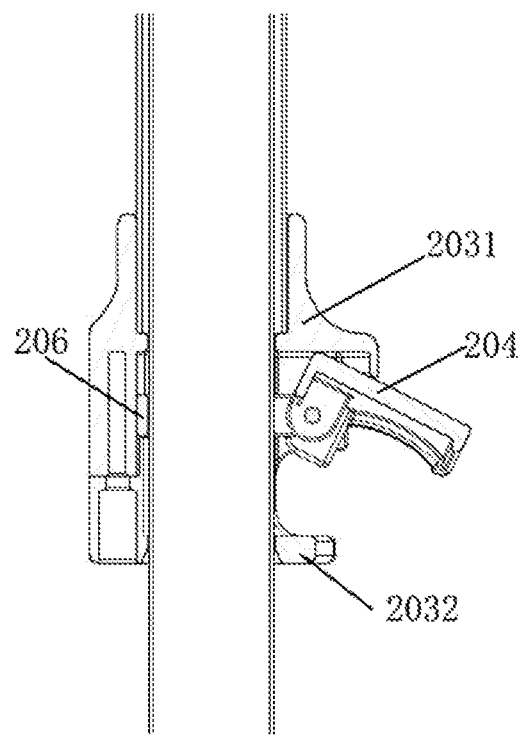
FIG. 5 is a cross-sectional structural view showing an unlocked state 5 in Embodiment 1 of the present invention.
Figure 5A:
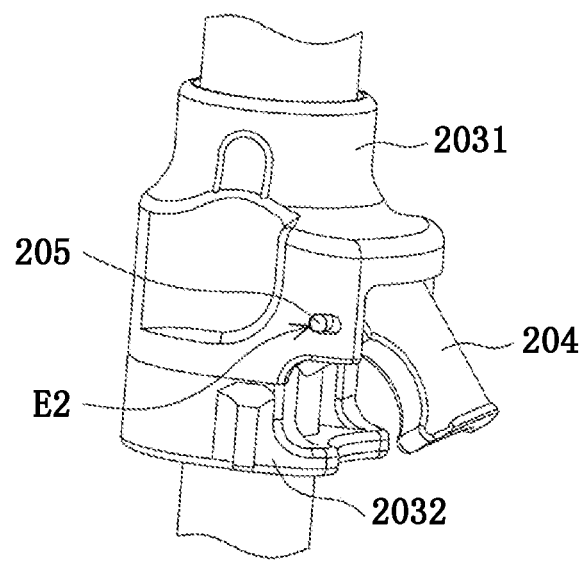
FIG. 5A is an external view corresponding to FIG. 5.

As shown in FIG. 1, a tent with convenient locking mechanism for telescopic leg tube comprises a tent rack 1 and support legs 2 attached to an underside of the tent rack 1. The tent rack 1 may be any type of tent rack of the prior art. The support legs 2 include a fixed leg tube 201, a movable leg tube 202 movable up and down within the fixed leg tube 201, and a locking mechanism defining movement of the movable leg tube 202. Among them, the fixed leg tube 201 and the movable leg tube 202 may be a round tube or a square tube, or may be a leg tube structure of a shape commonly used in the prior art.

As shown in FIGS. 2-5, the locking mechanism includes a locking plate 204 movably disposed on the fixed leg tube 201 and movable forward and backward relative to the movable leg tube 202, and a locking member 206 capable of locking the movable leg tube 202 by linking with the locking plate 204.

The locking plate 204 and the locking member 206 may be specifically configured to be cooperated by the mounting seat 203. The mounting seat 203 includes an upper mounting seat 2031 and a lower mounting seat 2032 that are fastened up and down and separated. Of course, the upper mounting seat 2031 and the lower mounting seat 2032 may also be a unitary structure. The mounting seat 203 has a through hole in the middle thereof, and the fixing leg tube 201 passes through the through hole to fix the mounting seat 203 at the lower port of the fixed leg tube 201. A mounting cavity for the locking plate 204 and the locking member 206 is provided between the upper mounting seat 2031 and the lower mounting seat 2032.

The mounting seat 203 is provided with a stroke hole 2033, that is, the stroke hole 2033 has a certain length, such as a raceway annular hole or the like. With the stroke hole 2033 of the above structure, it is convenient for the shaft disposed therein to move along the length of the stroke hole 2033.

The locking plate 204 is connected to the stroke hole 2033 through a shaft 205 provided, and the shaft 205 may be a separate pin shaft or a protruding shaft disposed at both ends of the locking plate 204. The locking plate 204 moves in the stroke hole 2033 by rotation of the shaft 205, thereby realizing the forward and backward movement of the locking plate 204 relative to the movable leg tube 202. As a preferred configuration, a side of the locking plate 204 adjacent to the movable leg tube 202 is provided with an abutment foot 2042 extending toward the movable leg tube 202, the abutment foot 2042 are provided with a plate shaft hole 2044, and the plate shaft hole 2044 is provided with a shaft 205. In the locked state, the abutment foot 2042 abuts against the mounting seat 203 or the fixed leg tube 201 to displace the shaft 205 to a first end E1 of the stroke hole 2033 away from the movable leg tube 202. In the unlocked state, the abutment foot 2042 is separated from the mounting seat 203 or the fixed leg tube 201 to displace the shaft 205 to a second end E2 of the stroke hole 203 adjacent to the movable leg tube 202. As a more preferred configuration, the abutment foot 2042 is disposed in a pair, respectively located at opposite ends of the side of the locking plate 204 adjacent the movable leg tube 202. In order to easily rotate the locking plate 204, the abutment foot 2042 is provided with an arcuate guide surface 2043. When the locking plate 204 is rotated, the arcuate guide surface 2043 may cooperate with the mounting seat 203 or the fixed leg tube 201 to achieve rotational guidance.

The locking member 206 and the locking plate 204 may be coaxially disposed through the shaft 205, and of course non-coaxially disposed, for example, disposed on the side of the locking pressing plate 204 adjacent to the movable leg tube 202, as long as the movement of the locking pressing plate 204 may drive the locking member 206 to move relative to the movable leg tube 202. When the locking member 206 and the locking plate 204 may be disposed coaxially through the shaft 205, a locking member limit block may be disposed inside the abutment foot 2042 of the locking plate 204 to prevent the locking member 206 from being displaced to the left and right.

The locking member 206 includes a locking end 2061 capable of being tightly cooperated with the movable leg tube 202 and a connecting end 2062 connected to the locking plate 204, and the locking end 2061 is brought into abutting against and separated from the movable leg tube 202 under the linkage of the locking plate 204 to achieve locking and unlocking. As a preferred configuration, the locking member 206 is a U-shaped member. An open end of the locking member 206 is the connecting end 2062, the connecting end 2062 being provided with a locking member latch hole 2063, and the locking member latch hole 2063 being used for connecting with the latch 205 and one end of the locking member away from the open end is a locking end 2061, the movable leg tube 202 passing through the locking member 206. In the locked state, the locking end 2061 abuts against the movable leg tube 202. In the unlocked state, the locking end 2062 is separated from the movable leg tube 202.

When the locking plate 204 is disposed coaxially with the locking member 206, the specific linkage manner between the locking plate 204 and the locking member 206 is as follows. Pulling the locking plate 204 outward. The shaft 205 is displaced along the stroke hole 2033 by the locking plate 204 to the second end E2 of the stroke hole 2033 adjacent the movable leg tube while the shaft 205 driving the locking member 206 to move, and an inner side wall of the locking end 2061 of the locking member 206 is separated from an outer wall of the movable leg tube 202 to form a gap with the movable leg tube 202, so that the movable leg tube 202 may move up and down to achieve unlocking. Pulling the locking plate 204 inwardly. Under the action of the abutment foot 2042, the shaft 205 is displaced along the stroke hole 2033 to the first end El of the stroke hole 2033 away from the movable leg tube while the shaft 205 driving the locking member 206 to move, and an inner wall of the locking end 2061 of the locking member 206 closely abuts against the outer wall of the movable leg tube 202, thereby eliminating the gap with the movable leg tube 202, so that the movable leg tube 202 is locked, and the movable leg tube 202 is prevented from moving up and down to achieve locking.

Embodiment 2

Figure 6:
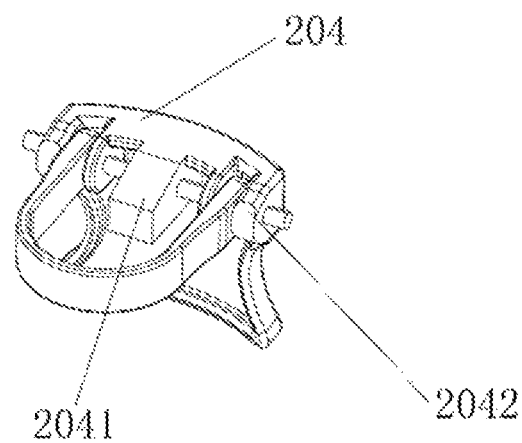
FIG. 6 is a view showing a structure of a locking plate and a locking member in a locking mechanism in Embodiment 2 of the present invention.
Figure 7:
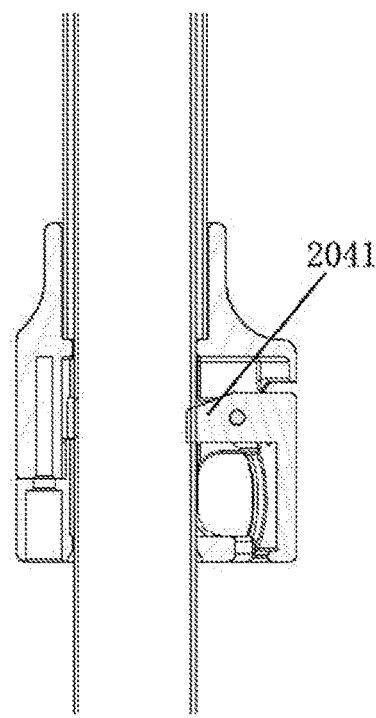
FIG. 7 is a cross-sectional structural view showing a locked state in Embodiment 2 of the present invention.
Figure 8:
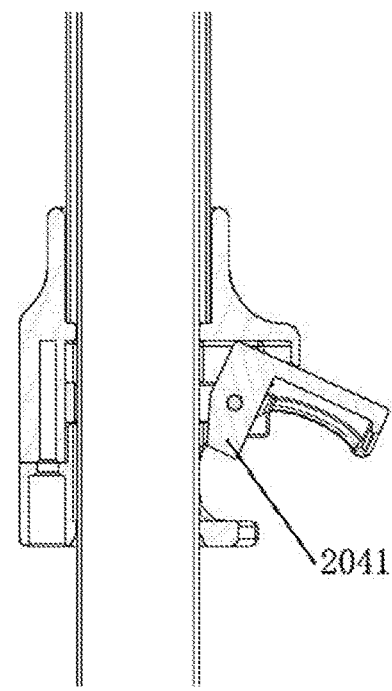
FIG. 8 is a cross-sectional structural view showing an unlocked state in Embodiment 2 of the present invention.

As shown in FIGS. 6-8, in the present embodiment, a side of the locking plate 204 adjacent to the movable leg tube 202 is further provided with a limit block 2041 extending toward the movable leg tube 202, and the limit block 2041 abuts against the movable leg tube 202 in the locked state to achieve auxiliary locking. As a preferred configuration, the limit block 2041 is disposed between the abutment feet 2042.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention

What is claimed is:

1. A tent with convenient locking mechanism for telescopic leg tube, the tent comprising a tent rack and a plurality of support legs attached to an underside of the tent rack, the support legs, each including a fixed leg tube, a movable leg tube movable up and down within the fixed leg tube, and a locking mechanism defining movement of the movable leg tube, wherein the locking mechanism includes a locking plate movably disposed on the fixed leg tube and movable forward and backward relative to the movable leg tube, and a locking member capable of locking the movable leg tube by linkage with the locking plate, wherein a mounting seat is fixedly disposed at a lower port of the fixed leg tube, the mounting seat is provided with a stroke hole formed therein, and the stroke hole is connected to the locking plate through a shaft movably provided in the stroke hole; the locking plate is rotatable between a locked state and an unlocked state, thereby realizing forward and backward movement of the locking plate relative to the movable leg tube, the stroke hole has a first end and a second end opposite to the first end, a length is defined between the first end and the second end, the shaft is movable along the length. in the locked state, the shaft is moved to the first end of the stroke hole away from the movable leg tube, and in the unlocked state, the shaft is moved to the second end of the stroke hole adjacent to the movable leg tube.

2. The tent with convenient locking mechanism for telescopic leg tube according to claim 1, wherein the locking member includes a locking end capable of being tightly cooperated with the movable leg tube and a connecting end connected to the locking plate, and the locking end is brought into abutting against and separated from the movable leg tube under the linkage of the locking plate to achieve locking and unlocking.

3. The tent with convenient locking mechanism for telescopic leg tube according to claim 2, wherein the locking member is a U-shaped member; an open end of the locking member is the connecting end, and one end of the locking member away from the open end is a locking end, the movable leg tube passes through the locking member; in the locked state, the locking end abuts against the movable leg tube; in the unlocked state, the locking end is separated from the movable leg tube.

4. The tent with convenient locking mechanism for telescopic leg tube according to claim 1, wherein the locking member is disposed coaxially with the locking plate through the shaft.

5. The tent with convenient locking mechanism for telescopic leg tube according to claim 4, wherein a side of the locking plate adjacent to the movable leg tube is provided with an abutment foot extending toward the movable leg tube, and the shaft is disposed in the abutment foot; in the locked state, the abutment foot abuts against the mounting seat or the fixed leg tube to displace the shaft to an end of the stroke hole away from the movable leg tube; in the unlocked state, the abutment foot is separated from the mounting seat or the fixed leg tube to displace the shaft to another end of the stroke hole adjacent to the movable leg tube.

6. The tent with convenient locking mechanism for telescopic leg tube according to claim 1, wherein the mounting seat includes an upper mounting seat and a lower mounting seat that are fastened up and down.

7. The tent with convenient locking mechanism for telescopic leg tube according to claim 1, wherein a side of the locking plate adjacent to the movable leg tube is provided with an abutment foot extending toward the movable leg tube, and the shaft is disposed in the abutment foot; in the locked state, the abutment foot abuts against the mounting seat or the fixed leg tube to displace the shaft to the first end of the stroke hole away from the movable leg tube; in the unlocked state, the abutment foot is separated from the mounting seat or the fixed leg tube to displace the shaft to the second end of the stroke hole adjacent to the movable leg tube.

8. The tent with convenient locking mechanism for telescopic leg tube according to claim 7, wherein the abutment foot is provided with an arcuate guide surface.

9. The tent with convenient locking mechanism for telescopic leg tube according to claim 1, wherein a side of the locking plate adjacent to the movable leg tube is further provided with a limit block extending toward the movable leg tube, and the limit block abuts against the movable leg tube in the locked state.

\* \* \* \* \*